United States Patent [19]
Ireton et al.

[11] Patent Number: 5,901,225
[45] Date of Patent: May 4, 1999

[54] SYSTEM AND METHOD FOR PERFORMING SOFTWARE PATCHES IN EMBEDDED SYSTEMS

[75] Inventors: Mark A. Ireton, Austin; Gerald Champagne, Buda; Corbett A. Marler, Round Rock, all of Tex.

[73] Assignee: Advanced Micro Devices, Inc., Sunnyvale, Calif.

[21] Appl. No.: 08/759,611

[22] Filed: Dec. 5, 1996

[51] Int. Cl.$^6$ .......................................................... H04L 9/00
[52] U.S. Cl. ........................................... 380/4; 395/183.11
[58] Field of Search ........................... 395/183.1, 183.11, 395/183.14, 183.22; 380/4

[56] References Cited

U.S. PATENT DOCUMENTS

| | | |
|---|---|---|
| 4,028,684 | 6/1977 | Divine et al. . |
| 4,319,079 | 3/1982 | Best ............................................ 380/4 |
| 5,357,627 | 10/1994 | Miyazawa et al. . |
| 5,454,100 | 9/1995 | Sagane . |
| 5,553,301 | 9/1996 | New et al. ......................... 395/183.22 |
| 5,740,413 | 4/1998 | Alpert et al. ......................... 395/183.1 |
| 5,764,884 | 6/1998 | Van Fleet ............................ 395/183.14 |

FOREIGN PATENT DOCUMENTS

| | | |
|---|---|---|
| 0640916A2 | 8/1994 | European Pat. Off. . |
| 04312126 | 4/1991 | Japan . |
| 2227584 | 12/1989 | United Kingdom . |

OTHER PUBLICATIONS

XP 000552115 Wilkinson, M.A., "Breakpoints in Masked Microcontrollers To Fix Latent Software Defects", Motorola Technical Developments, Nov. 1995, pp. 2–3.

Primary Examiner—Salvatore Cangialosi
Attorney, Agent, or Firm—Conley, Rose & Tayon; Jeffrey C. Hood

[57] ABSTRACT

A system and method for performing software patches for embedded system devices in which the firmware of the system is included in non-alterable storage of the device. The patch mechanism provides a means for finding firmware errors, prototyping fixes to the errors and/or prototyping new functionality of the firmware of the embedded system. The system comprises an embedded system device coupled to an external memory. The device includes a non-alterable memory, including firmware, coupled to a processor. The device further includes a relatively small amount of patch RAM within the device also coupled to the processor. The patches are loaded from the external memory into the patch RAM. The device further includes a means for determining if one or more patches are to be applied. If the device detects a patch to be applied, the system loads the patch from the external memory into the patch RAM. The device also includes a breakpoint register. When the value of the program counter of the processor equals the value in the breakpoint register, a patch insertion occurs, i.e., the processor deviates from executing firmware to executing patch instructions. Preferably, the embedded system device comprises a single integrated circuit. The processor may include a plurality of breakpoint registers. The patch may be encrypted for increased security. Multiple patches may be chained together, and run-time patch replacement is contemplated.

34 Claims, 7 Drawing Sheets

SYSTEM AND METHOD FOR PERFORMING SOFTWARE PATCHES IN EMBEDDED SYSTEMS

FIELD OF THE INVENTION

The present invention relates to embedded systems and in particular to software patches of embedded systems with non-alterable firmware.

DESCRIPTION OF THE RELATED ART

As integrated circuit technology has advanced at a relatively rapid rate, embedded systems incorporating integrated circuit devices have become more and more commonplace. Examples of embedded system devices are intelligent controllers for televisions, automobile engines, microwave ovens, telephone answering machines, medical equipment, etc. The embedded system devices typically comprise a processor, such as a microprocessor, micro-controller, or digital signal processor (DSP), and storage elements, such as read only memory (ROM). The storage elements typically include software which the processor executes to perform functions of an application, such as those previously listed. The device further includes application logic to interface with the television, automobile engine, telephone, or other application to gather data from and/or control the application.

Typically, embedded system devices employ permanent storage elements, such as ROM, to store their software. Permanent storage elements are used because many embedded systems do not reside in a computer system, or similar system. That is, the systems do not have secondary permanent storage, such as a disk or tape drive, to store the embedded system software. Hence, permanent storage is required on the embedded system device itself in order to store the embedded system software, since the embedded system software cannot be stored elsewhere within the system. Most economical forms of solid state permanent storage, such as ROM, are non-alterable storage elements. The embedded system software is frequently referred to as "firmware", since software is permanently stored in the hardware of the system.

Historically, although the firmware of various embedded systems may have been sophisticated, i.e., employing sophisticated DSP algorithms for example, typically, firmware is not complex, relatively speaking. That is, firmware is traditionally relatively small, and therefore the likelihood of firmware errors, or bugs, has been relatively small. However, contemporary embedded systems are rapidly increasing in complexity, which is increasing the likelihood of programming errors in the firmware, which is included in non-alterable storage.

Furthermore, in rapidly evolving marketplaces in which the embedded systems are commonly sold, it is often desirable to add new features to an existing product to increase functionality. Given the permanent nature of the firmware, lengthy cycles are involved in making a firmware change during the process of developing the new features.

Traditional techniques of adding new functionality to a firmware system require the existence of special logic which either includes its own random access memory (RAM) for firmware storage, or is capable of being interfaced to external RAM for firmware storage. An example of this special logic is an In-Circuit Emulator (ICE). In many instances an ICE is simply not a viable alternative, as this could require the development of a special purpose part at enormous expense. This is also uneconomical for embedded systems in particular as there will likely not be a market for sales of the debug part to help mitigate the development costs.

It is also often desirable to be able to perform analysis or development of existing firmware in the final target system, since the characteristics of the real system may be either very difficult, or even impossible, to model in any type of emulator or simulator. This is also difficult or impossible due to the permanent nature of the firmware.

Therefore, a system and method for finding firmware errors, prototyping fixes to the errors, and/or prototyping new functionality of the firmware of an embedded system is desired.

The notion of software breakpoints for debugging software is well known in the art of computer systems. Typically, the processor within the computer system includes a program counter register which contains the address of the current instruction to be fetched and executed. The processor further comprises debug registers. At least one of the debug registers contains an instruction address. When the value of the program counter equals the value of the instruction address debug register, a debug exception, or interrupt, occurs. When the processor receives the debug exception, the processor deviates execution of the currently executing program to a debug handler program, or routine. One of the debug registers is a debug control register containing one or more bits to enable or disable the breakpoint mechanism.

An example of a processor employing a breakpoint mechanism is the INTEL i486 processor. The i486 processor comprises four Debug Address Registers (D0–D3) and a Debug Control Register (DR7). If the appropriate bits are present in the Debug Control Register, when the value of the program counter register equals the value in one of the Debug Address Registers, a debug exception (INT 1) occurs. More specifically, an instruction breakpoint fault occurs. A debug exception causes the processor to deviate execution from the current program to a debug exception handler.

Typically, the debug exception handler invokes a debugger program which allows the user of a computer system to interact with the computer system to debug the software executing on the system. The debugger program allows the user to perform such tasks as examine memory locations and register contents of the computer system for the purpose of determining software errors, i.e., bugs. However, computer systems, unlike embedded systems whose firmware resides in non-alterable storage, enjoy the privilege of prototyping fixes to software errors and/or prototyping new software functionality by simply recompiling the program, loading the newly compiled program, and executing the program on the system. In contrast, embedded systems do not enjoy this luxury.

SUMMARY OF THE INVENTION

The present invention comprises a system and method for performing software patches for embedded system devices in which the firmware of the system is included in non-alterable storage of the device. The patch mechanism advantageously provides a means for finding firmware errors, prototyping fixes to the errors and/or prototyping new functionality of the firmware of the embedded system. The system comprises an embedded system device coupled to an external memory source. The device comprises a non-alterable memory, including firmware, coupled to a processor. The device further comprises a relatively small amount of patch RAM within the device. The patches are not part of the system under test, but are instead loaded into the patch RAM.

The device further comprises a means for determining if one or more patches are to be applied. If the device detects patches to be applied, the device loads the patches from the external memory into the patch RAM via an external memory interface of the device. The device also comprises a means for causing the firmware to deviate from normal execution and to execute the patch. Preferably the deviation means comprises a breakpoint register. The points of deviation are referred to as breakpoints. At the end of a patch, program flow can either return from where normal execution deviated, or can continue elsewhere as specified by the patch developer. When the value of the program counter of the processor equals the value in the breakpoint register, the deviation from firmware execution to patch instruction execution, i.e., a patch insertion, occurs. Preferably, the embedded system device comprises a single integrated circuit.

The patch comprises a sequence of bytes included in the external memory. The patch comprises a portion including executable patch instructions. Another portion, preferably the first portion, of the patch contains an offset to the executable patch instructions. Another portion, preferably the second portion, of the patch contains the length of the patch. Another portion of the patch contains local variables for the patch. Another portion of the patch contains executable startup instructions of the patch, i.e., instructions which are executions after loading the patch to perform once only operations prior to insertion of the patch.

One embodiment of the invention comprises a breakpoint handler, wherein the processor deviates to the breakpoint handler when the program counter value equals the breakpoint register value. The breakpoint handler detects the presence of a breakpoint condition and branches to the patch.

One embodiment of the invention comprises command interface logic, wherein various aspects of patch loading are controlled. In particular, any or all of the address of the patch in external memory, the address of the patch in the patch RAM, the patch start address, the breakpoint address, the loading of the breakpoint register, the patch size, and the presence of a patch may be controlled via the command interface.

One embodiment of the invention contemplates a method for chaining together multiple patches. The invention further contemplates run-time loading of patches, in addition to boot-time loading of patches, for the purpose, inter alia, of replacing a currently executing patch. The invention contemplates an embodiment in which the patches are loaded into the patch RAM via a direct memory access transfer. In one embodiment the processor comprises multiple breakpoint registers allowing for multiple patch insertions.

The invention contemplates storing the patch in the external memory in an encrypted form and decrypting the patch as it is loaded into the patch RAM. The encryption mechanism increases the security of the system by preventing unauthorized users from loading and inserting patches.

Thus, the present invention comprises a system and method for performing software patches for embedded system devices in which the firmware of the system is included in non-alterable storage of the device in order to find firmware errors, prototype fixes to the errors and/or prototype new functionality of the firmware of the embedded system.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
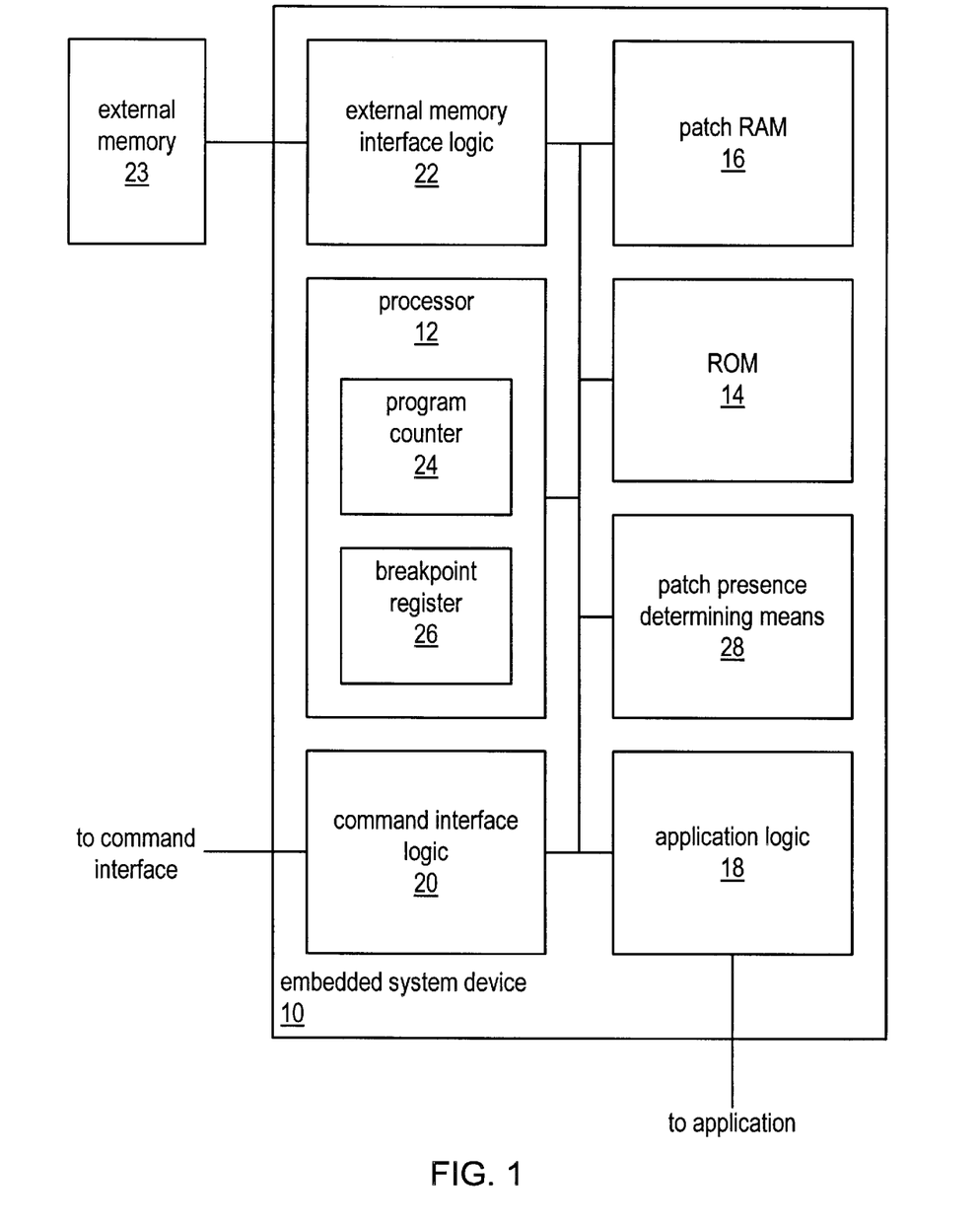
FIG. 1 is a block diagram of an embedded system according to the present invention.

Referring now to FIG. 1, a block diagram of an embedded system device 10 according to the present invention is shown. The device comprises a processor 12. The device further comprises ROM 14, patch RAM 16, application logic 18, external memory interface logic 22, and a patch presence detection means 28 all coupled to the processor 12.

The processor 12 comprises a microprocessor, microcontroller, digital signal processor (DSP), or other type of software instruction processing device. In one embodiment of the present invention the processor 12 is an ADI 2171 DSP core. The processor 12 fetches firmware instructions from the ROM 14 and executes the firmware instructions. Upon certain conditions, described below, the processor 12 deviates from fetching instructions from the ROM 14 and fetches firmware patch instructions from the patch RAM 16 and executes the firmware patch instructions.

The ROM 14 comprises read only memory storage elements as are well known in the art of solid state memory circuits. The invention, however, is not limited to ROM technology, but rather is intended to comprehend other forms of non-alterable, i.e., once-programmable, solid state memory elements. Preferably, the ROM 14 comprises read only memory storage which is programmed during fabrication of the device 10. That is, the firmware of the device 10 is determined by the fabrication mask of the ROM 14 portion of the device 10. Consequently, changing the firmware (such as for determining bugs, testing bug fixes, or testing new functionality) is very costly and time consuming since making a firmware change would require fabricating a new version of the device 10.

The patch RAM 16 comprises dynamic random access memory (DRAM) or static random access memory (SRAM) storage elements as are well known in the art of solid state memory circuits. The patch RAM 16, however, is not limited to RAM technology, but rather is intended to comprehend other forms of alterable solid state memory elements.

The application logic 18 comprises circuitry to interface with the application in which the device 10 is employed or to perform functions of the application. For example, the application logic 18 is a buffer, receiver, transceiver, or register for interfacing with other circuitry such as telephone signals. Another example of the application logic comprises circuitry for performing analog to digital conversion.

The processor 12 comprises a program counter 24 and a breakpoint register 26. The program counter 24 contains the current address of the instruction to be fetched by the processor 12. The program counter 24 is updated by the processor 12 each time an instruction is fetched. The breakpoint register 26 contains a breakpoint location, or breakpoint address. When the value of the program counter 24 equals the value of the breakpoint register 26 a "patch insertion" occurs, i.e., the processor 12 deviates execution from fetching and executing firmware instructions in the ROM 14 to fetching and executing firmware patch instructions in the patch RAM 16 as shown in FIG. 2.

Figure 2:
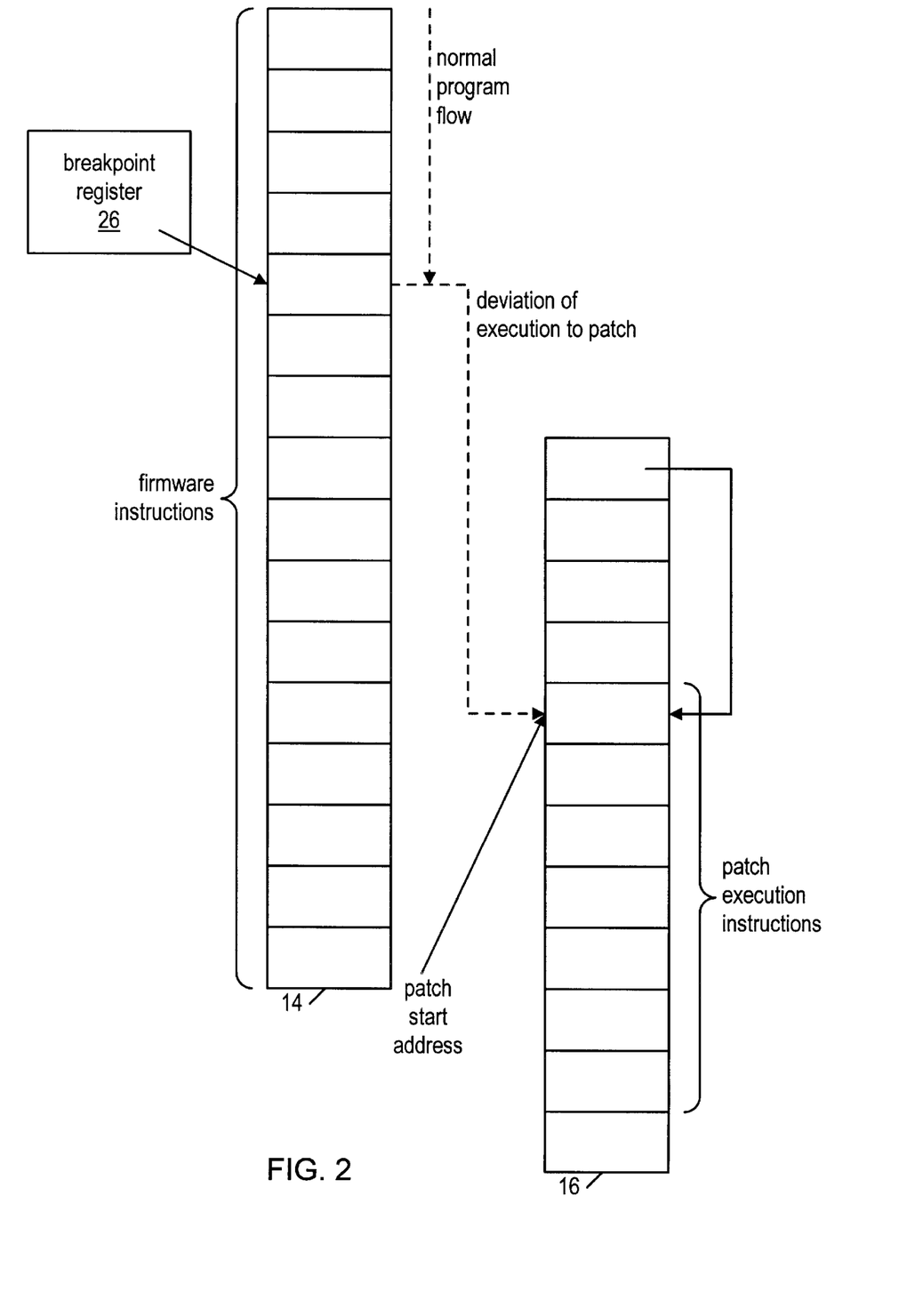
FIG. 2 is a block diagram illustrating deviation of normal firmware execution to execution of patch instructions in the system of FIG. 1.

FIG. 2 illustrates the normal program flow of execution of firmware instructions included within the ROM 14 of the device 10. The firmware instructions are shown included in sequential address locations within the ROM 14. When the program counter 24 (of FIG. 1) value equals the breakpoint register 26 value, a patch insertion occurs, i.e., the processor 12 (of FIG. 1) deviates from normal program flow to the patch start address to execute the patch execution instructions included in the patch RAM 16 as shown.

Referring again to FIG. 1, the external memory interface logic 22 comprises digital circuitry coupled to an external memory 23 for loading patches from the external memory 23 to the patch RAM 16. The external memory 23 is an EPROM, FLASH ROM, RAM, or any other suitable external storage device.

The invention contemplates an embodiment in which the device 10 comprises command interface logic 20 coupled to the processor 12. The command interface logic 20 comprises circuitry for receiving commands and providing status to an external device which communicates with the device 10 via a command interface. The invention contemplates an embodiment in which the command interface logic 20 comprises a serial interface such as an RS-232 interface. A second embodiment contemplates the command interface logic 20 comprising a parallel interface such as those commonly found on personal computers, commonly for communicating with printers. The command interface logic 20 is used, inter alia, to load patches into the patch RAM 16 and/or control the loading of patches to the patch RAM 16 through another interface such as the external memory interface logic 22.

The patch presence detection means 28 is readable by the processor 12 and is used to indicate to the processor 12 whether or not a patch is present. Preferably the patch presence detection means 28 is a mode register comprising a bit to indicate the presence of a patch. Data is forced by an external device (not shown) onto output pins of the device 10 during reset of the device 10 to write the mode register with a value to selectively indicate the presence or absence of a patch. Alternatively, the patch presence detection means 28 is a test mode input pin of the device 10 which is driven by an external device. Alternatively, the patch presence detection means 28 is a mode register included within the command interface logic 20 and is written with a value to selectively indicate the presence or absence of a patch.

Figure 3:
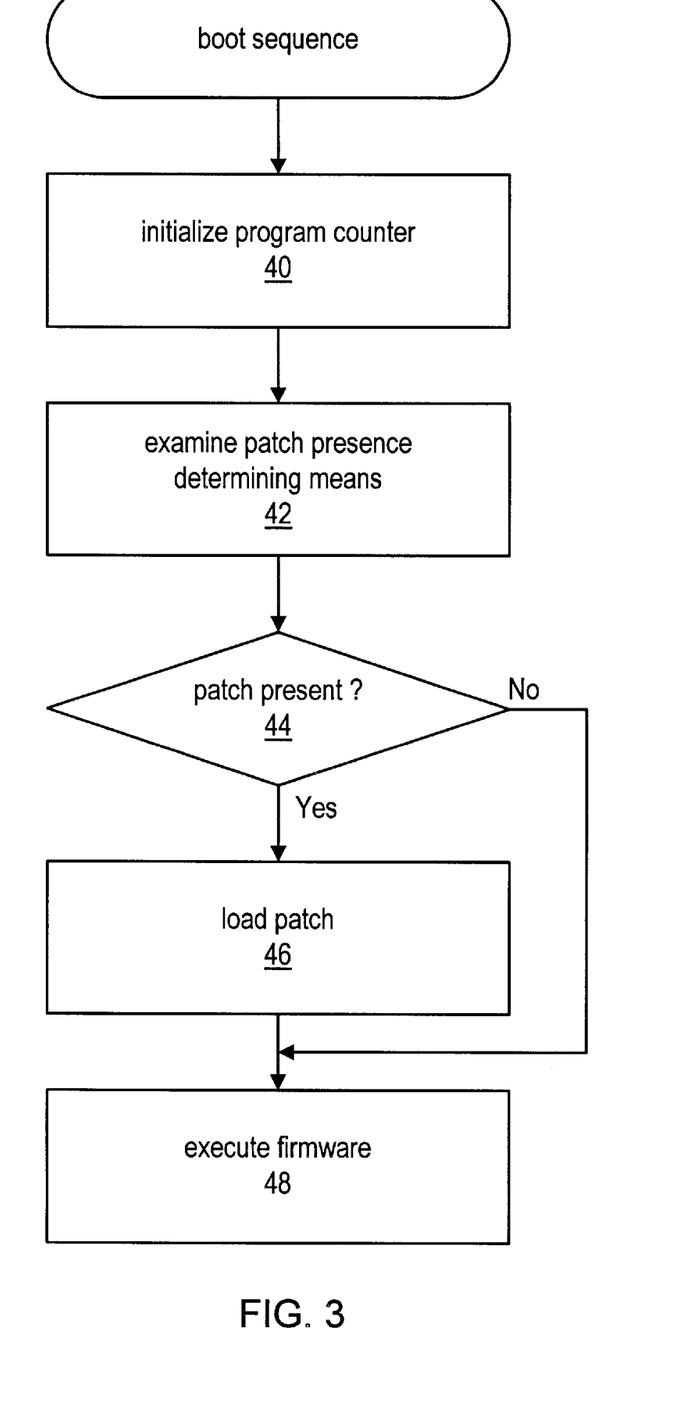
FIG. 3 is a flowchart illustrating steps taken by the system of FIG. 1 to perform a boot sequence including selectively loading a patch.

Referring now to FIG. 3, a flowchart illustrating steps taken by the device 10 (of FIG. 1) to perform a boot sequence including selectively loading a patch is shown. When the processor 12 (of FIG. 1) is reset, it initializes its program counter 24 to a predetermined value in step 40 and begins fetching and executing instructions at the address contained in the program counter 24. The initial address, i.e., boot address, contained in the program counter 24 is an address in the ROM 14. Preferably, the boot address is near the top or bottom of the processor 12 address space. In one embodiment the boot address is address zero.

A plurality of the instructions fetched from the boot address examine the patch presence detection means 28 in step 42. The processor 12 determines if the device is in a patch mode, i.e., that a patch is present, in step 44 based upon the value of the patch presence detection means 28. If a patch is present, the processor 12 loads the patch in step 46. The processor 12 then proceeds to execute the firmware in step 48. More details about how the patch is loaded and the firmware is executed will be given below.

Figure 4:
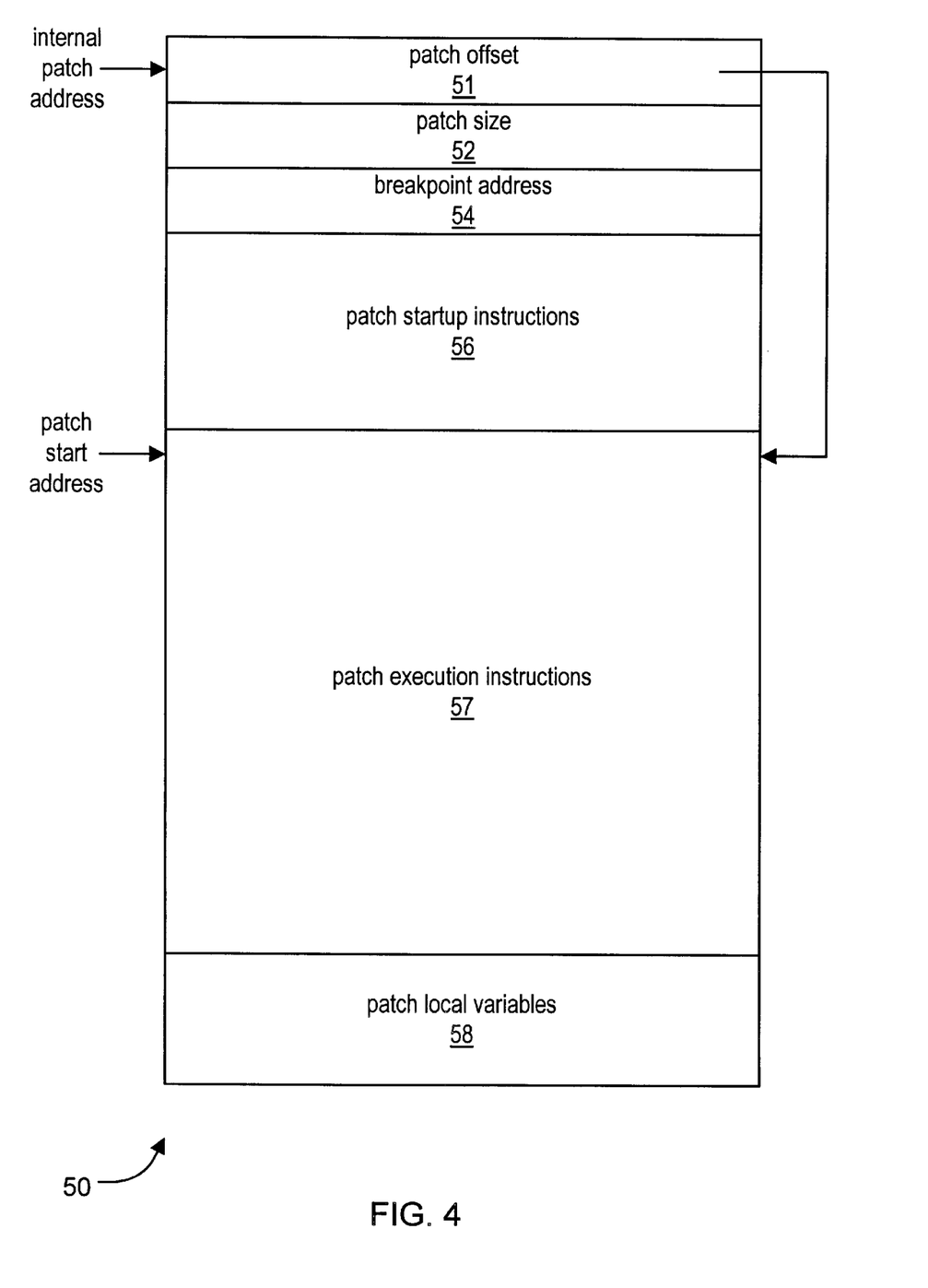
FIG. 4, illustrates the layout of one embodiment of a patch.

Referring now to FIG. 4, the layout of one embodiment of a patch 50 is shown. A patch comprises a sequential set of data bytes in memory. The patch 50 is loaded from the external memory 23 (of FIG. 1) into the patch RAM 16 (of FIG. 1) at an internal patch address, i.e., the address in the patch RAM 16 where the patch 50 is loaded. The first portion of the patch 50, i.e., the data at the internal patch address, comprises a patch offset 51 from the internal patch address to the patch execution instructions. The sum of the internal patch address and the patch offset 51 determines the patch start address, i.e., the address of the patch execution instructions, as shown.

The next portion of the patch 50 includes the patch size 52. Preferably, the patch size 52 is the number of double words (i.e., 32-bit words) comprising the patch 50.

The next portion of the patch 50 includes the breakpoint address 54 of the patch 50, i.e., the address to be loaded into the breakpoint register 26 (of FIG. 1). The loading of the breakpoint address 54 into the breakpoint register 26 will be described in the discussion of FIG. 5.

The next portion of the patch 50 includes a set of patch startup instructions 56. The patch startup instructions 56 initialize patch local variables 58 and perform any other actions which are required on a once only basis. The execution of the patch startup instructions 56 will be described in the discussion of FIG. 5.

The next portion of the patch 50 includes the patch execution instructions 57, the location of which is specified by the patch offset 51. The patch execution instructions 57 comprise instructions executable by the processor 12 (of FIG. 1) to perform the desired functionality of the patch, such as finding firmware errors, prototyping fixes to firmware errors and/or prototyping new functionality of the firmware. When the value of the program counter 24 equals the value of the breakpoint register 26, a patch insertion occurs, i.e., the processor 12 deviates from fetching and executing instructions in the ROM 14 and begins fetching and executing the patch execution instructions 57 from the patch RAM 16.

The next portion of the patch 50 includes the patch local variables 58. The patch local variables 58 are variables used by the patch execution instructions to perform the desired patch functions.

Figure 5:
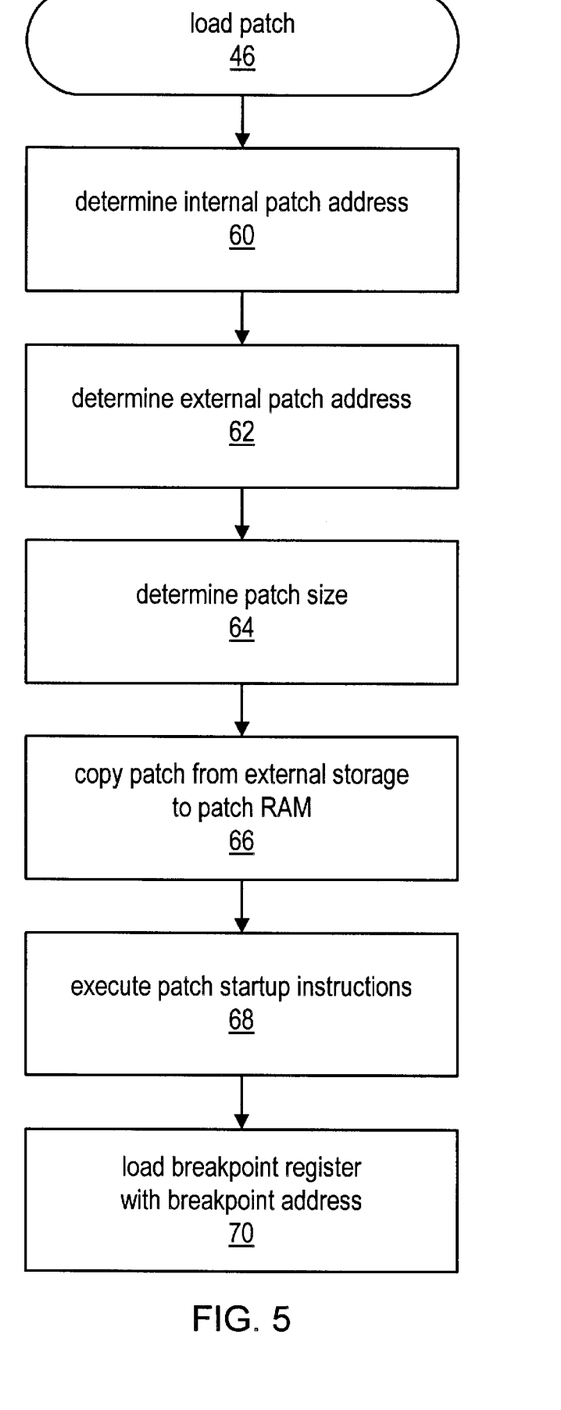
FIG. 5 is a flowchart illustrating detailed steps taken to perform the patch loading step of FIG. 3.

Referring now to FIG. 5, a flowchart illustrating in more detail steps taken to perform the patch loading step 46 of FIG. 3 is shown. The processor 12 determines the internal patch address, i.e., the address in the patch RAM 16 at which the patch is to be loaded, in step 60. Preferably, the internal patch address is address fixed at address zero in the patch RAM 16. Alternatively, the internal patch address is specified by an external device in a register within the device 10. Alternatively, the internal patch address is specified in the command interface logic 20 via the command interface.

The processor 12 determines the external patch address, i.e., the address in the external memory 23 at which the patch is stored, in step 62. Preferably, the external patch address is fixed at an address within the external memory 23 which is a number of bytes from the end of the external memory 23 which is equal to the size of the patch RAM 16. For example, if the external memory 23 is a 64K13 EPROM, and the patch RAM 16 is 512 bytes of RAM, the external patch address would be at address 65024 (i.e., 65536–512). Alternatively, the external patch address is specified by an external device in a register within the device 10. Alternatively, the external patch address is specified in the command interface logic 20 via the command interface.

The processor determines the patch size, i.e., the number of bytes of the patch, in step 64. Preferably the patch includes the number of 32-bit words comprising the patch, as shown in FIG. 4. In one embodiment, the patch size is included in the fourth byte of the patch. Alternatively, the patch size is specified by an external device in a register within the device 10. Alternatively, the patch size is specified in the command interface logic 20 via the command interface. Alternatively, the patch size is fixed at a predetermined length. Alternatively, the processor 12 assumes the patch size is equal to the size of the patch RAM 16.

Once the processor 12 has determined the external patch address, the internal patch address, and the patch size, the processor 12 copies patch size words of data from the external patch address of the external memory 23 to the internal patch address of the patch RAM 16 in step 66. As previously stated, in one embodiment, the patch size is specified near the beginning of the patch itself. Hence, the processor 12 copies enough of the patch to determine the size of the patch and then copies the remaining bytes of the patch after determining the size.

In one embodiment, a set of patch startup instructions 56 exists in the patch, as shown in FIG. 4. After copying the patch to the patch RAM 16, the processor 12 executes the patch startup instructions 56 in step 68. The patch startup instructions 56 initialize the patch local variables and perform any other actions which are required on a once only basis.

The processor 12 then loads the breakpoint register 26 with the breakpoint address, i.e., the address at which the processor 12 deviates execution from the firmware instructions included in the ROM 14 to the patch execution instructions included in the patch RAM 16 in step 70. Preferably the breakpoint address 54 is included in the patch as shown in FIG. 4. Alternatively, the breakpoint address is specified by an external device in a register within the device 10. Alternatively, the breakpoint address is specified in the command interface logic 20 via the command interface. The processor 12 then returns to the boot code to begin executing the firmware.

Figure 6:
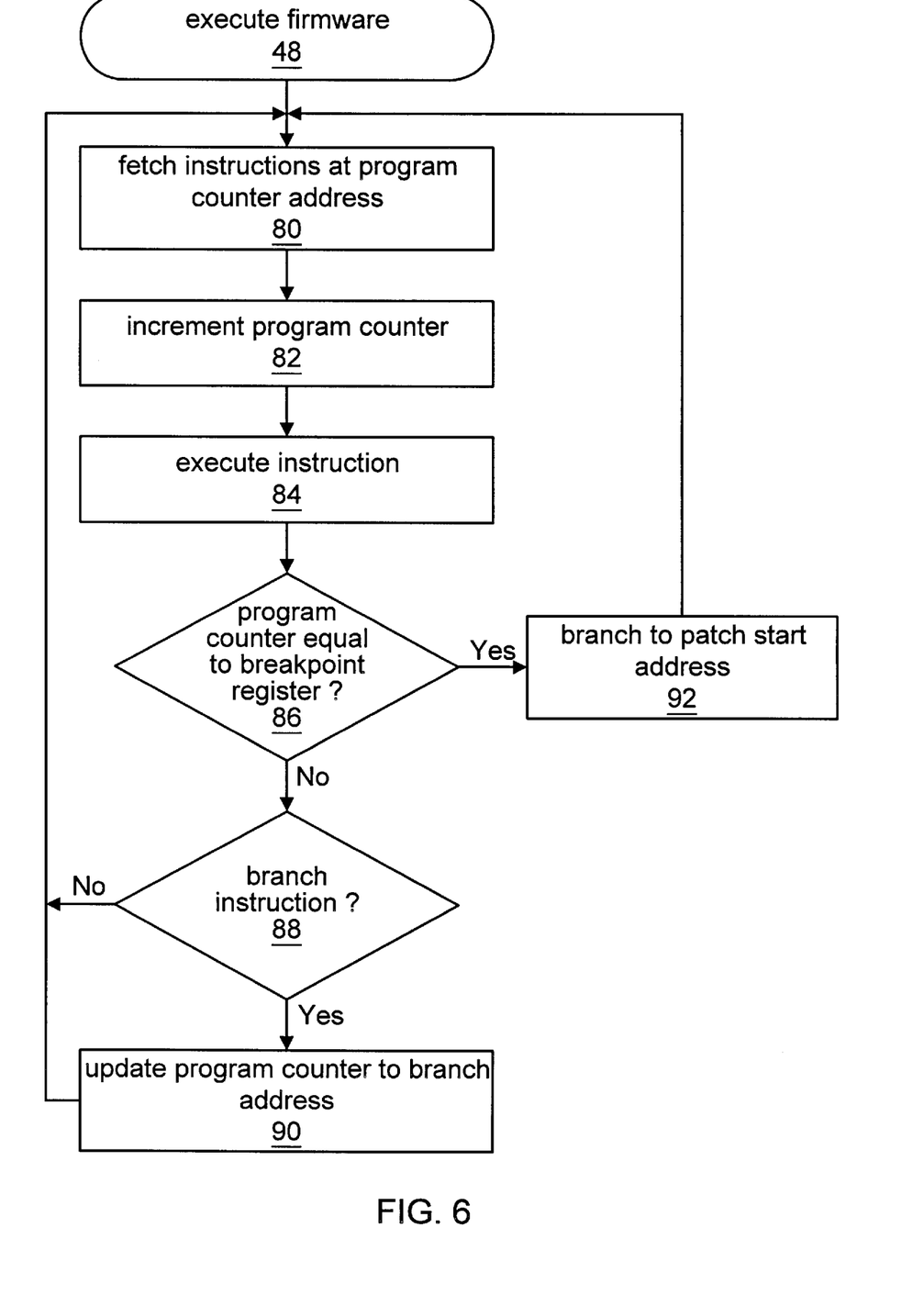
FIG. 6 is a flowchart illustrating detailed steps taken to perform the firmware execution step of FIG. 4.

Referring now to FIG. 6, a flowchart illustrating in more detail steps taken to perform the firmware execution step 48 of FIG. 3 is shown. The processor 12 fetches an instruction at the value of the program counter 24 in step 80. The processor 12 next increments the program counter 24 by the size of the instruction fetched in step 82. In one embodiment, the processor 12 instruction size is fixed, hence the program counter 24 is incremented by a fixed amount after each instruction fetch. In another embodiment, the processor 12 instruction size is variable. The processor 12 executes the instruction fetched, in step 84.

The processor 12 determines if the program counter 24 value is equal to the breakpoint register 26 value in step 86. If the values are not equal, the processor 12 determines if the instruction executed in step 84 is a branch instruction in step 88. If the instruction is a branch instruction, the processor 12 updates the program counter 24 to the address specified by the branch instruction in step 90. If the instruction is not a branch instruction, the processor 12 returns to step 80 to fetch another instruction at the program counter 24.

If in step 86 the processor 12 determines that the values of the program counter 24 and the breakpoint register 26 are equal, the processor 12 branches to the patch start address, i.e., the address of the patch execution instructions, in step 92, as illustrated in FIG. 2. Branching to the patch start address comprises updating the program counter 24 to have a value equal to the patch start address. The processor 12 then returns to step 80 to begin fetching instructions at the updated program counter 24, i.e., the patch start address.

Figure 7:
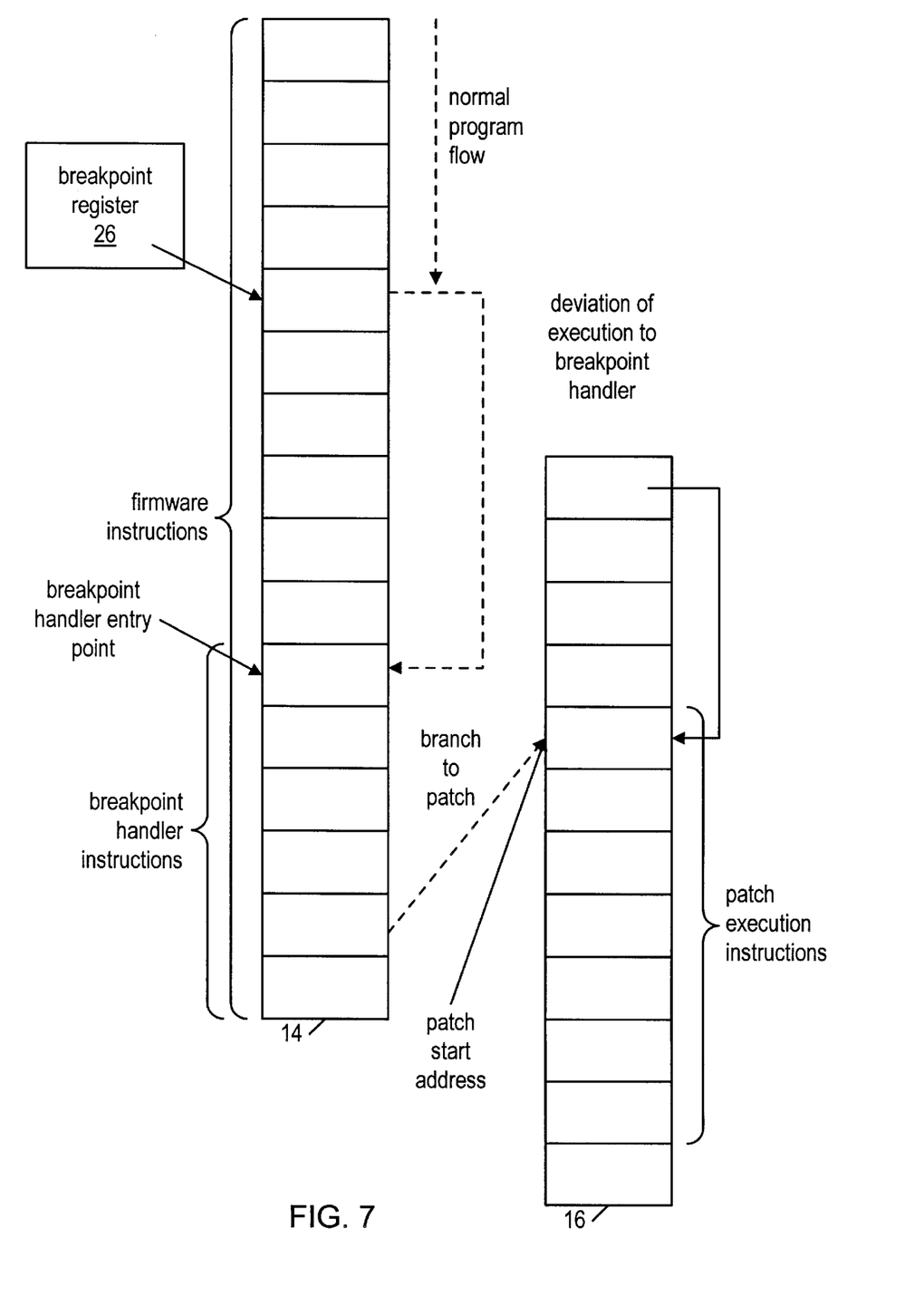
FIG. 7 is a block diagram illustrating an embodiment of the present invention comprising a breakpoint handler.

Referring now to FIG. 7, a block diagram illustrating an embodiment of the present invention comprising a breakpoint handler is shown. Preferably, branching to the patch start address, i.e., step 92 (of FIG. 6), comprises the processor deviating to a breakpoint handler, wherein the breakpoint handler executes a branch instruction to the patch start address. The breakpoint handler resides in the ROM 14 as part of the firmware. The breakpoint handler entry point resides at a fixed location in the processor 12 address space, i.e., in a fixed location in the ROM 14.

When a breakpoint condition occurs, i.e., when the value of the breakpoint register 26 equals the value of the program counter 24, the processor 12 deviates from normal execution, i.e., execution of the current instruction, and begins fetching and executing instructions from the breakpoint handler entry point, as shown. The breakpoint handler calculates the patch start address by adding the internal patch address to the patch offset 51 (of FIG. 4). The breakpoint handler then executes a branch instruction to the patch start address and the processor 12 begins fetching and executing the patch execution instructions 57 (of FIG. 4).

In one embodiment, the processor 12 comprises a non-maskable interrupt (NMI). An NMI occurs under at least two conditions. The first condition is when an NMI input signal to the processor 12 becomes active. The second condition is a breakpoint condition, i.e., when the value of the breakpoint register 26 equals the value of the program counter 24. The processor 12 receives an NMI whenever either of the two NMI conditions occurs. When an NMI condition occurs, the processor 12 branches to an NMI vector, i.e., a fixed address in the address space of the processor 12. Preferably, the NMI vector address is the address of the breakpoint handler entry point described supra.

The breakpoint handler determines which of the two NMI conditions generated the NMI. In one embodiment, the NMI input signal indicates a power down condition. In this embodiment, the device 10 comprises a means for determining if a power down condition is present. The breakpoint handler determines if the power down condition is present, by reading the power down condition determining means. If a power down condition is not present, the breakpoint handler assumes that a breakpoint condition has occurred and correspondingly branches to the patch start address as described supra.

Alternatively, the step 92 (of FIG. 6) of branching to the patch start address comprises the processor 12 (of FIG. 1) directly loading the program counter 24 with the value of the patch start address. In one embodiment, the processor 12 directly loads the program counter 24 from a patch start address register. In this embodiment, the processor 12, during the boot sequence, calculates the patch start address by adding the internal patch address to the patch offset 51 and populating the patch start address register.

In another embodiment, the processor 12 directly loads the program counter 24 by calculating the patch start address and loading it into the program counter 24. In this embodiment, the processor 12 calculates the patch start address by adding the internal patch address to the patch offset 51.

Alternatively, the step 92 (of FIG. 6) of branching to the patch start address comprises a branch instruction to the patch start address being forced into the instruction stream. The processor 12 comprises a data bus upon which instructions are fetched from the ROM 14 and patch RAM 16. Forcing the branch instruction into the instruction stream comprises forcing onto the data bus of the processor 12 the branch instruction to the patch start address whenever the processor 12 fetches an instruction from a "known address". Preferably the "known address" is the address to which the processor deviates upon the occurrence of a breakpoint condition. Thus, the actual data at the "known address" in ROM 14 or patch RAM 16 is discarded in favor of the surrogate branch instruction to the patch start address. The processor 12 executing the branch instruction to the patch start address causes the program counter 24 to get updated with the patch start address and the patch execution instructions 57 to be fetched and executed.

In one embodiment, the processor 12 fetches and executes instructions in a pipelined manner, as is well known in the art of processor design. In this embodiment, the processor 12 may execute one or more instructions beyond the instruction at which the breakpoint is to occur. In such case, the patch programmer must be aware of the pipelined characteristics of the processor 12 and create a patch which takes these characteristics into consideration.

Alternate Embodiments

The present invention contemplates an embodiment in which the patch start address is specified in the command interface logic 20 via the command interface, rather than in the patch itself. Another embodiment is contemplated in which the internal patch address is specified by an external device in a register within the device 10. Alternatively, the patch start address is fixed, i.e., hard-coded into the processor 12.

The present invention contemplates an embodiment in which the processor 12 comprises a plurality of breakpoint registers. Each breakpoint register may be loaded with a different value, thus providing the ability to insert a plurality of patches, i.e., each breakpoint register has an associated patch start address. If the program counter 24 value equals any of the values in the plurality of breakpoint registers, a patch insertion of the patch corresponding to the breakpoint register whose value equals the value of the program counter 24 occurs. The plurality of patch start addresses associated with each of the breakpoint registers are specified by any of the means described supra, i.e., within the patch itself, via the command interface logic 20, by a plurality of registers within the device 10, or at a fixed address associated with each breakpoint register.

The present invention further contemplates an embodiment in which the patch execution instructions alter the contents of the breakpoint register and patch start address, thereby providing a means to achieve "patch chaining." To illustrate by way of example, a first patch, patch A, executes and during execution alters the patch start address with a new value corresponding to a patch B and loads the breakpoint register with a new value corresponding to a patch B, thus enabling patch B and disabling itself, i.e., disabling patch A. Thus, patch B has been "chained" to patch A.

Patch B then performs the reverse action, i.e., enable patch A and disable patch B. The number of patches which may be chained is unrestricted. Further, patch chaining may be combined with the embodiment comprising a plurality of breakpoint registers.

The present invention contemplates an embodiment in which patches are "run-time loaded" in addition to limit-time loaded. That is, patches are loaded during real time operation of the device 10, i.e., during firmware execution (step 48 of FIG. 3) in addition to during the boot sequence. Run-time patch loading provides a mechanism for replacing patches which are currently executing. The present invention contemplates employing run-time patch loading to accomplish patch chaining as described supra.

The present invention contemplates an embodiment in which patches are loaded by a DMA operation from the external memory 23 into the patch RAM 16. This embodiment allows real-time execution of the system to continue while the patch is being loaded. In this embodiment, the breakpoint register 26 and patch start address are loaded via the command interface.

In many embedded systems it is desirable to protect the device 10 from being scrutinized by the end user of the device 10. It is desirable that an unauthorized person not be able to load a patch. It is further desirable that an unauthorized person not be able to extract the firmware from the device. The existence of a mechanism for loading software patches creates a security breach. The present invention contemplates an encryption mechanism for increasing the security of the embedded system comprising the device 10. Preferably the patch is encrypted prior to storage in the external memory and decrypted as the patch is loaded into the device 10 in order to recover the original bit sequence of the patch, i.e., a bit sequence of instructions executable by the processor 12.

In one embodiment, a "one time pad" encryption mechanism is employed. A one time pad is a string of random numbers used to encrypt a message, in particular, a bit sequence of software program instructions. Each string of random numbers is used only once to encrypt the software, i.e., the patch. In one embodiment, the random numbers are obtained by sampling ionospheric scatter.

In one embodiment of the one time pad encryption mechanism, the patch is encrypted by multiplying the patch by a polynomial, or encryption key, in the Galois Field (2), i.e., GF(2). The patch is decrypted by dividing the patch by the same polynomial as it is being loaded into the device 10. Galois Fields are well known in the art of coding. The reader is referred to *Introduction to Trellis-Coded Modulation with Applications*, Biglieri, et. al., Macmillan Publishing Company, 1991, which is hereby incorporated by reference, for a more detailed description of Galois Fields.

If an encrypted patch is loaded with an invalid encryption polynomial, the patch, once decrypted, will be a bit sequence which will have an extremely high probability of not being valid processor instructions. Preferably, when the processor executes invalid instructions with unexpected results. Thus, an unauthorized user is prevented from executing a patch which might allow a means for extracting the firmware of the embedded system device or from executing a patch to perform an unauthorized function.

Preferably the processor 12 performs the decryption. The present invention also contemplates the device 10 comprising dedicated logic to perform the decryption. The present invention is not intended to be limited to GF polynomial encryption techniques, but rather is intended to encompass any suitable encryption technique.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A embedded system device configured to receive a software patch, comprising:

a processor including a breakpoint register and a program counter, each adapted for storing a value;

a non-alterable memory coupled to said processor, wherein said non-alterable memory includes instructions executable by said processor; and an alterable memory coupled to said processor configured to store a patch, wherein said patch comprises patch instructions executable by said processor;

wherein said processor is configured to deviate from executing said instructions included in said non-alterable memory to execute said patch instructions stored in said alterable memory when said program counter value equals said breakpoint register value, wherein said patch is encrypted prior to being loaded into said alterable memory, and wherein said device is configured to decrypt said patch when loading said patch into said alterable memory.

2. The device as recited in claim 1, wherein said device comprises a single integrated circuit.

3. The device as recited in claim 1, wherein said device is configured to load said patch into said alterable memory from a memory external to said device.

4. The device as recited in claim 1, wherein said device further comprises:

patch presence detection means for indicating a presence of a patch in an external memory;

wherein said device is coupled to said patch presence detection means and is configured to load said patch into said alterable memory if said patch presence detection means indicates the presence of said patch.

5. The device as recited in claim 1, wherein said patch further comprises a patch offset indicating the location of said patch instructions.

6. The device as recited in claim 1, wherein said patch further comprises a patch size indicating the size of said patch.

7. The device as recited in claim 1, wherein said patch further comprises a breakpoint address for loading into said breakpoint register, wherein said processor deviates from executing said instructions included in said non-alterable memory to execute said patch instructions stored in said alterable memory when said program counter value equals said breakpoint register value loaded into said breakpoint register.

8. The device as recited in claim 1, wherein said patch further comprises variables used in operation of said patch instructions.

9. The device as recited in claim 1, wherein said patch further comprises startup instructions, wherein said processor is configured to execute a plurality of said startup instructions after loading said patch and prior to executing said patch instructions.

10. The device as recited in claim 1, wherein said non-alterable memory includes breakpoint handler instructions, wherein said processor is configured to deviate from executing said instructions included in said non-alterable memory to execute said breakpoint handler instructions when said program counter value equals said breakpoint register value, wherein said breakpoint handler instructions branch to said patch instructions.

11. The device as recited in claim 1, wherein said device comprises a plurality of breakpoint registers each containing a value, wherein said alterable memory is configured to store a plurality of patches each comprising patch instructions, wherein said plurality of patches correspond to said plurality of breakpoint registers, wherein said processor is configured to deviate from executing said instructions included in said non-alterable memory to execute said patch instructions of one of said plurality of patches stored in said alterable memory when said program counter value equals a corresponding one of said breakpoint register values.

12. The device as recited in claim 1, wherein said device further comprises:

means for receiving a direct memory access transfer of said patch into said alterable memory.

13. The device as recited in claim 1, wherein said processor comprises an interrupt signal generated when said program counter value equals said breakpoint register value, wherein said deviation occurs in response to said interrupt signal.

14. The device as recited in claim 1, wherein said device further comprises:

command interface logic operably coupled to said processor to control loading said patch into said alterable memory.

15. The device as recited in claim 14, wherein said breakpoint register value is loaded into said breakpoint register using said command interface logic.

16. A embedded system configured to receive a software patch, comprising:

an embedded system device comprising:

a processor including a breakpoint register and a program counter, each containing a value;

a non-alterable memory coupled to said processor, wherein said nonalterable memory includes instructions executable by said processor; and an alterable memory coupled to said processor configured to store a patch, wherein said patch comprises patch instructions executable by said processor; and an external memory operably coupled to said device including said patch;

wherein said processor is configured to load said patch from said external memory to said alterable memory and to execute said patch, wherein said patch is encrypted prior to being loaded into said alterable memory, and wherein said device is configured to decrypt said patch when loading said patch into said alterable memory.

17. The system as recited in claim 16, wherein said patch further comprises a patch offset indicating the location of said patch instructions.

18. The system as recited in claim 16, wherein said patch further comprises a patch size indicating the size of said patch.

19. The system as recited in claim 16, wherein said patch further comprises a breakpoint address for loading into said breakpoint register, wherein said processor deviates from executing said instructions included in said non-alterable memory to execute said patch instructions stored in said alterable memory when said program counter value equals said breakpoint register value loaded into said breakpoint register.

20. The system as recited in claim 16, wherein said patch further comprises variables used in operation of said patch instructions.

21. The system as recited in claim 16, wherein said patch further comprises startup instructions, wherein said processor is configured to execute a plurality of said startup instructions after loading said patch and prior to executing said patch instructions.

22. A method for executing a patch in an embedded system device comprising a processor including a breakpoint register and a program counter, each containing a value, a non-alterable memory coupled to said processor, wherein said non-alterable memory includes instructions executable by said processor, and an alterable memory coupled to said processor configured to store a patch, wherein a portion of said patch comprises patch instructions executable by said processor, the method comprising:

initializing said program counter to a value;

loading said breakpoint register with a breakpoint address;

determining a presence of said patch after said initializing said program counter value and before said loading said breakpoint register;

loading said patch into said alterable memory before said loading said breakpoint register if said patch is present;

encrypting said patch prior to said initializing said program counter to a value;

decrypting said encrypted patch during said loading said patch;

fetching an instruction from said non-alterable memory at an address equal to said program counter value;

incrementing said program counter in response to said fetching;

executing said instruction;

performing said fetching, said incrementing and said executing until said program counter value equals said breakpoint register value;

deviating from said fetching, said incrementing and said executing when said program counter value equals said breakpoint address;

executing a plurality of patch instructions of a patch included in said alterable memory in response to said deviating.

23. The method as recited in claims 22, wherein said loading said patch comprises copying said patch from an external memory coupled to said device into said alterable memory.

24. The device as recited in claim 23, wherein said copying comprises said processor performing said copying.

25. The device as recited in claim 23, wherein said copying comprises a direct memory access transfer.

26. The method as recited in claim 22, wherein said patch comprises startup instructions, wherein the method further comprises executing said startup instructions prior to said loading said breakpoint register.

27. The method as recited in claim 22, wherein said patch comprises said breakpoint address, wherein said loading said breakpoint register with said breakpoint address comprises loading said breakpoint address from said patch into said breakpoint register.

28. The method as recited in claim 22, wherein said non-alterable memory further includes breakpoint handler instructions, the method further comprising:

executing said breakpoint handler instructions after said deviating;

said breakpoint handler instructions branching to said patch instructions.

29. The method as recited in claim 22, wherein said deviating comprises loading said program counter with the address of said patch instructions.

30. The method as recited in claim 22, wherein said deviating comprises forcing a branch instruction to said patch instructions when performing said fetching an instruction from said non-alterable memory when said fetching address is a predetermined address.

31. The method as recited in claim 22, wherein a single integrated circuit comprises said device.

32. A method for executing a series of patches in an embedded system device comprising a processor including a breakpoint register and a program counter, each containing a value, a non-alterable memory coupled to said processor, wherein said non-alterable memory includes firmware instructions executable by said processor, and an alterable memory coupled to said processor configured to store said series of patches, wherein a portion of each of said series of patches comprises patch instructions executable by said processor, the method comprising:

executing said firmware instructions;

loading a first of said series of patches into said alterable memory;

loading said breakpoint register with a first breakpoint address after said loading said first of said series of patches;

deviating from said executing said firmware instruction when said program counter value equals said first breakpoint address;

executing said first of said series of patches in response to said deviating from said executing said firmware instructions;

loading a second of said series of patches into said alterable memory;

loading said breakpoint register with a second breakpoint address after said loading said second of said series of patches;

deviating from said executing said first of said series of patches when said program counter value equals said second breakpoint address;

executing said second of said series of patches in response to said deviating from said executing said first of said series of patches.

33. A method for executing a series of patches in an embedded system device comprising a processor including a breakpoint register and a program counter, each containing a value, a non-alterable memory coupled to said processor, wherein said non-alterable memory includes firmware instructions executable by said processor, and an alterable memory coupled to said processor configured to store said series of patches, wherein a portion of each of said series of patches comprises patch instructions executable by said processor, the method comprising:

loading a first of said series of patches into said alterable memory;

loading a second of said series of patches into said alterable memory;

loading said breakpoint register with a first breakpoint address after said loading said first and second of said series of patches;

executing said firmware instructions;

deviating from said executing said firmware instruction when said program counter value equals said first breakpoint address;

executing said first of said series of patches in response to said deviating from said executing said firmware instructions;

loading said breakpoint register with a second breakpoint address after said loading said second of said series of patches;

deviating from said executing said first of said series of patches when said program counter value equals said second breakpoint address;

executing said second of said series of patches in response to said deviating from said executing said first of said series of patches.

34. A method for replacing a patch in an embedded system device comprising a processor including a breakpoint register and a program counter, each containing a value, a non-alterable memory coupled to said processor, wherein said non-alterable memory includes firmware instructions executable by said processor, and an alterable memory coupled to said processor configured to store said series of patches, wherein a portion of each of said series of patches comprises patch instructions executable by said processor, the method comprising:

loading a first patch into said alterable memory;

loading said breakpoint register with a first breakpoint address after said loading said first patch;

executing said firmware instructions;

deviating from said executing said firmware instruction when said program counter value equals said first breakpoint address;

executing said first patch in response to said deviating from said executing said firmware instructions;

loading a second patch into said alterable memory;

loading said breakpoint register with a second breakpoint address after said loading said second patch;

deviating from said executing said first patch when said program counter value equals said second breakpoint address;

executing said second patch in response to said deviating from said executing said first patch.

* * * * *